United States Patent
Singh et al.

(10) Patent No.: US 9,432,924 B1
(45) Date of Patent: Aug. 30, 2016

(54) PREFERRED ROAMING LIST DISTRIBUTION OVER WIRELESS LOCAL AREA NETWORKS

(75) Inventors: Jasinder Pal Singh, Olathe, KS (US); Keith E. Moll, Olathe, KS (US); Chandiramohan Vasudevan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 13/461,457

(22) Filed: May 1, 2012

(51) Int. Cl.
*H04W 4/00* (2009.01)
*H04W 48/18* (2009.01)
*H04W 88/06* (2009.01)
*H04W 84/12* (2009.01)

(52) U.S. Cl.
CPC ............. *H04W 48/18* (2013.01); *H04W 88/06* (2013.01); *H04W 84/12* (2013.01)

(58) Field of Classification Search
CPC ... H04W 48/18; H04W 88/06; H04W 84/12; H04W 48/16; H04W 8/12; H04W 8/183; H04W 8/06; H04W 8/26
USPC ......... 455/432.1, 432.3, 435.1, 435.2, 435.3, 455/418, 419
See application file for complete search history.

(56) References Cited

U.S. PATENT DOCUMENTS

| | | | |
|---|---|---|---|
| 7,194,264 B2 | 3/2007 | Li et al. | |
| 7,603,119 B1 | 10/2009 | Durig et al. | |
| 7,702,329 B1 | 4/2010 | Durig et al. | |
| 7,894,812 B1 | 2/2011 | Durig et al. | |
| 2004/0043788 A1 | 3/2004 | Mittal | |
| 2006/0262743 A1 | 11/2006 | Kalhan et al. | |
| 2007/0004405 A1* | 1/2007 | Buckley et al. | 455/434 |
| 2008/0146232 A1* | 6/2008 | Knisely | 455/437 |
| 2009/0196265 A1* | 8/2009 | Mariblanca Nieves et al. | 455/433 |
| 2009/0247153 A1 | 10/2009 | Haralson et al. | |
| 2010/0075669 A1 | 3/2010 | Sparks et al. | |
| 2010/0093343 A1* | 4/2010 | Qi et al. | 455/432.1 |
| 2010/0093349 A1 | 4/2010 | Gandhi et al. | |
| 2010/0167724 A1* | 7/2010 | Haran et al. | 455/432.3 |
| 2010/0291863 A1* | 11/2010 | Hsu et al. | 455/3.04 |

\* cited by examiner

*Primary Examiner* — Thai Vu

(57) ABSTRACT

Systems, methods, and software for providing a preferred roaming list (PRL) to a wireless communication device are provided herein. In one example, a method of operating a wireless local area network (WLAN) device is presented. The method includes receiving a request for network access to the WLAN from a wireless communication device, identifying a PRL for the wireless communication device responsive to at least the request, where the wireless communication device can use the PRL to access a cellular communication service. The method also includes transferring the PRL to the wireless communication device.

18 Claims, 3 Drawing Sheets

PREFERRED ROAMING LIST DISTRIBUTION OVER WIRELESS LOCAL AREA NETWORKS

TECHNICAL FIELD

Aspects of the disclosure are related to the field of communications, and in particular, wireless devices in wireless local area networks and cellular communication networks.

TECHNICAL BACKGROUND

Wireless communication networks can include wireless local area networks (WLAN) as well as cellular communication networks and wireless wide area networks (WWAN). Each type of wireless communication network has associated wireless architectures and protocols for handing wireless communications between the various devices involved.

Cellular communication networks typically allow a wireless communication device which receives wireless service from a home cellular network operator to also receive service from other non-home cellular network operators via roaming agreements. In order for a wireless communication device to determine which roaming cellular networks and associated wireless parameters are to be used during roaming operations on the roaming cellular networks, a preferred roaming list (PRL) is typically distributed to the wireless communication device over the home cellular communication network. However, the PRL distribution process can be difficult to achieve in areas of poor cellular service coverage, and also consumes bandwidth which can be used for user communications, such as data services and voice calls.

Overview

Systems, methods, and software for providing a preferred roaming list (PRL) to a wireless communication device are provided herein. In one example, a method of operating a wireless local area network (WLAN) device is presented. The method includes receiving a request for network access to the WLAN from a wireless communication device, identifying a PRL for the wireless communication device responsive to at least the request, where the wireless communication device can use the PRL to access a cellular communication service. The method also includes transferring the PRL to the wireless communication device.

In another example, a WLAN device is presented. The WLAN device includes a communication interface configured to receive a request for network access to the WLAN from a wireless communication device, and a processing system configured to identify a preferred roaming list (PRL) for the wireless communication device responsive to at least the request, where the wireless communication device can use the PRL to access a cellular communication service. The communication interface is also configured to transfer the PRL to the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
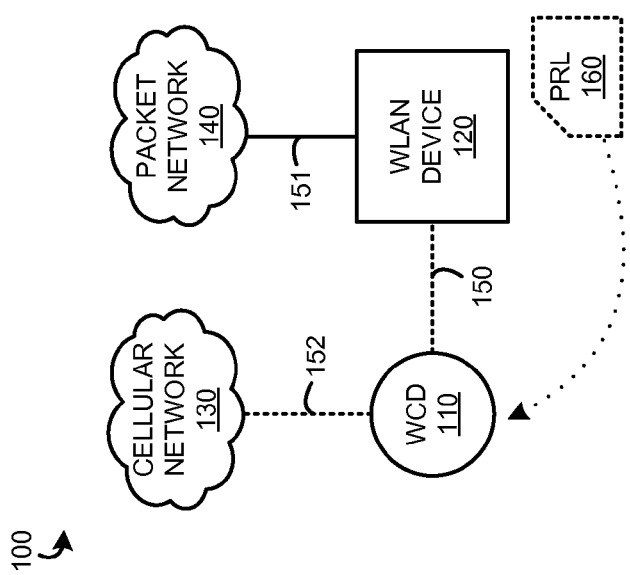
FIG. 1 is a system diagram illustrating a communication system.

FIG. 1 is a system diagram illustrating communication system 100. Communication system 100 includes wireless communication device (WCD) 110, wireless local area network (WLAN) device 120, cellular network 130, and packet network 140. WCD 110 and cellular network 130 communicate over cellular wireless link 152. WCD 110 and WLAN device 120 communicate over wireless local area network 150. WLAN device 120 and packet network 140 communicate over link 151.

In FIG. 1, WCD 110 can receive cellular communication service from cellular network 130 over cellular wireless link 152. WCD 110 can receive wireless local area network communication service from WLAN device 120 over wireless local area network 150. Cellular network 130 can include voice calls, text messages, data access, or other communication services provided over a cellular communication network. Although a single cellular network 130 is shown in this example, in further examples multiple cellular services or cellular communication networks can be included, which can comprise home or roaming cellular communication networks. WLAN device 120 can include a WLAN router or other wireless networking device for providing local network access to packet network 140. In some examples, WLAN device 120 provides a wireless fidelity (Wi-Fi) network as WLAN 150. Packet network can include a data network, the Internet, wide area networks, or other packet-based networks, including combinations thereof.

Preferred roaming list 160 can be used by a wireless communication device for accessing communication services over a cellular communication network, such as cellular network 130. PRL 160 includes information related to initial access of a cellular communication network or cellular service, such as carrier frequencies, network identifiers, offsets, or other information, including combinations thereof. This information can also include information related to initial network access using cellular communication frequencies and channels. For example, a PRL can include a listing of carrier frequencies or carrier channels corresponding to a cellular network operator, along with other corresponding information related to channels, frequency offsets, bandwidth indicators, modulation information, pseudo-random noise (PN) status, and the like. A PRL can also indicate a priority of cellular network operators to be used in roaming operations. A PRL can comprise a full listing of the home and preferred roaming providers and associated information, or can comprise a PRL update which can include a subset of the full listing. In typical examples, a PRL is received over a home cellular communication network. However, in this example, PRL 160 is received over WLAN 150, as discussed further in FIG. 2.

Figure 2:
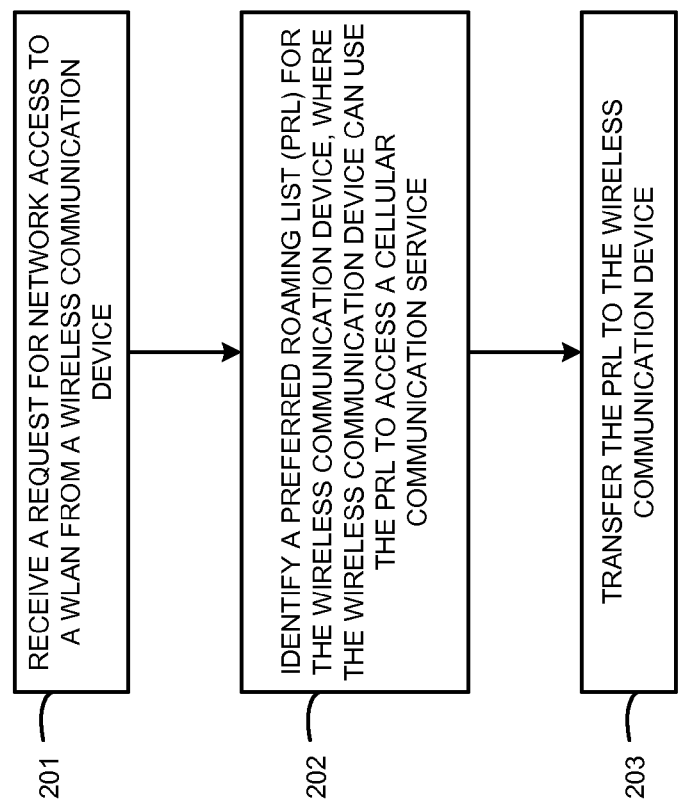
FIG. 2 is a flow diagram illustrating a method of operation of a wireless local area network device.

FIG. 2 is a flow diagram illustrating a method of operation of wireless local area network device 120. The operations of FIG. 2 are referenced herein parenthetically. In FIG. 2, WLAN device 120 receives (201) a request for network access to WLAN 150 from WCD 110. Responsive to at least the request, WLAN device 120 identifies (202) preferred roaming list (PRL) 160 for WCD 110, where WCD 110 can use PRL 160 to access a cellular communication service. In this example, WCD can use PRL 160 received over WLAN 150 to access cellular network 130 via cellular wireless link 152. WLAN device 120 can receive PRL 160 from further systems, such as a PRL server, over packet network 140, or from equipment of cellular network 130, including combinations thereof. WLAN device 120 then transfers (203) PRL 160 to WCD 110.

Figure 3:
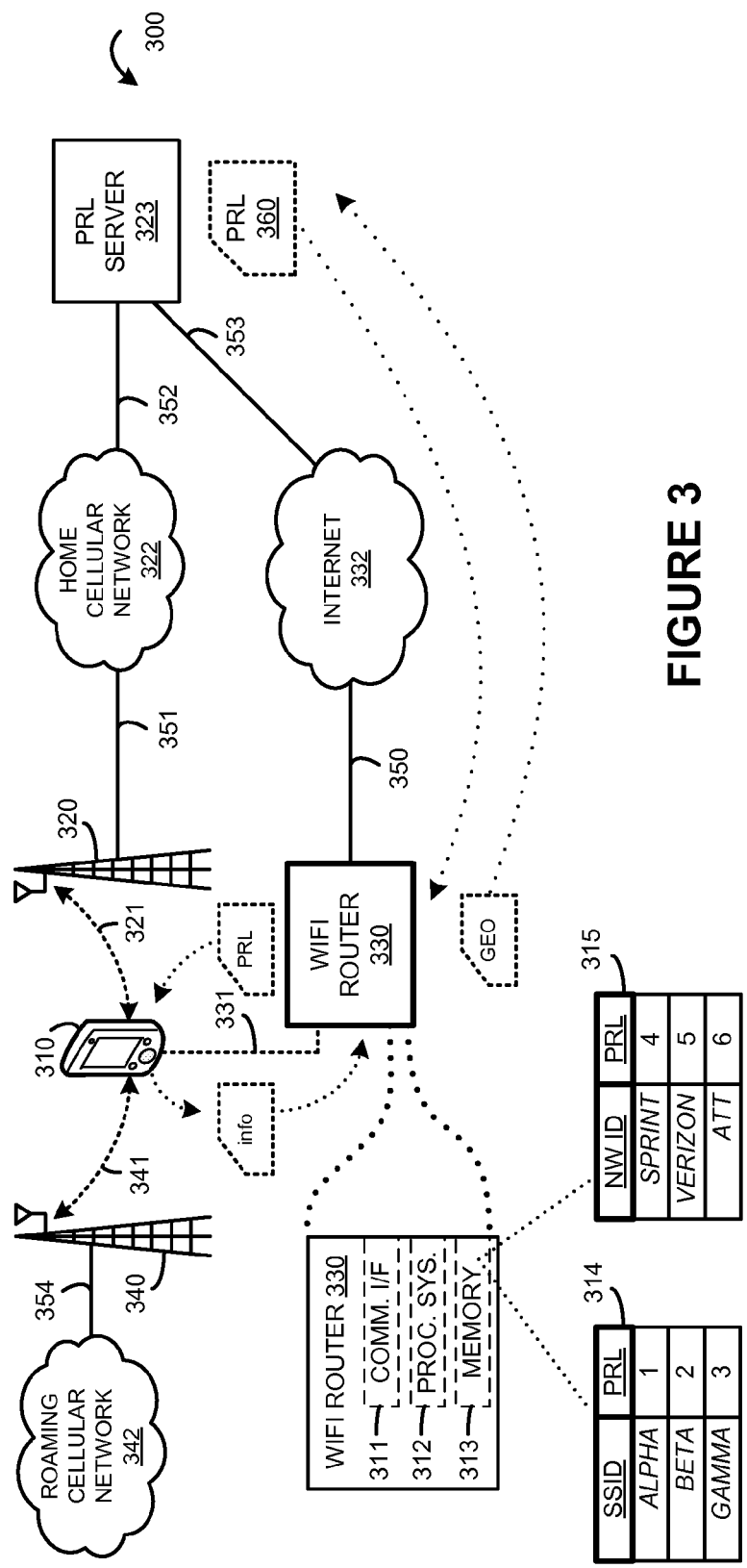
FIG. 3 is a system diagram illustrating a communication system.

FIG. 3 is a system diagram illustrating communication system 300. Communication system 300 includes wireless communication device (WCD) 310, home base station 320, home cellular network 322, preferred roaming list (PRL) server 323, roaming base station 340, roaming cellular network 342, wireless fidelity (WIFI) router 330, and Internet 332.

WCD 310 is a smartphone device which can communicate over both cellular communication networks and wireless local area networks (WLANs). WCD 310 can include equipment as discussed herein for WCD 110, although variations are possible. In this example, a cellular communication network pathway can include either a home cellular network or a roaming cellular network. The home cellular network is represented by base station 320 and home cellular network 322, where WCD 310 communicates with base station 320 over cellular link 321. The roaming cellular network is represented by base station 340 and roaming cellular network 342, where WCD 310 communicates with base station 340 over cellular link 341. The WLAN is represented by WIFI router 330, where WCD 310 communicates with WIFI router 330 over WLAN link 331. WLAN router 330 provides access to Internet 332 for WCD 310.

Home cellular network 322 includes the wireless access equipment of a home wireless communication service provider in this example, such as a wireless carrier from which WCD 310 initially purchased wireless service. Roaming cellular network 342 includes the wireless access equipment of a non-home wireless communication service provider in this example, such as a wireless carrier which provides roaming services to wireless communication devices which initially purchased wireless service from another wireless carrier. Home cellular network 322 and roaming cellular network 342 can each include equipment and systems as discussed herein for cellular network 130, although variations are possible.

Links 350-354 each use metal, glass, optical, air, space, or some other material as the transport media. In this example, link 350 comprises an IP link, such as Ethernet, time-division multiplexing (TDM) T1 link, data over cable service interface specification (DOCSIS), or digital subscriber line (DSL), including combinations and variations. Links 351 and 354 comprise base station backhaul links which can include T1 links, Ethernet, or optical networking links, including combinations and variations. Links 352-353 are IP networking links, which can include Ethernet, T1, optical networking, or other links, and can include intermediate devices and networks, including combinations and variations.

A detailed view of WIFI router 330 is illustrated in FIG. 3. WIFI router 330 can each include equipment and systems as discussed herein for WLAN device 120, although variations are possible. WIFI router 330 includes communication interfaces 311, processing system 312, and memory 313. In operation, processing system 312 is operatively linked to communication interfaces 311 and memory 313. Processing system 312 is capable of executing software stored in memory 313. When executing the software, processing system 312 drives WIFI router 330 to operate as described herein. WIFI router 330 can also include a user interface, such as device indicator lights or a web-based interface presented over at least link 331 for monitoring, altering, or controlling a status or configuration of WIFI router 330.

Processing system 312 may be implemented within a single processing device but may also be distributed across multiple processing devices or sub-systems that cooperate in executing program instructions. Examples of processing system 312 include general purpose central processing units, microprocessors, application specific processors, and logic devices, as well as any other type of processing device.

Communication interfaces 311 include at least two wireless communication interfaces for communicating over different wireless networks. A first communication interface can include a wide area network communication interface which can communicate over an IP link as described for link 350. A second communication interface can include a wireless local area network interface which can communicate over a wireless local area network link as described for link 331. Examples of communication interfaces 311 include antennas, power amplifiers, RF circuitry, transceivers, network interface card equipment, modems, and other communication circuitry. Each communication interface can include dedicated antenna or transceiver circuitry.

Memory 313 may comprise any storage media readable by processing system 312 and capable of storing software. Memory 313 may include volatile and nonvolatile, removable and non-removable media implemented in any method or technology for storage of information, such as computer readable instructions, data structures, program modules, or other data. Memory 313 may be implemented as a single storage device but may also be implemented across multiple storage devices or sub-systems. Memory 313 may comprise additional elements, such as a controller, capable of communicating with processing system 312. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 313 may comprise computer program instructions, firmware, or some other form of machine-readable processing instructions having processes that when executed by processing system 312 direct WIFI router 330 to operate as described herein. For example, software drives WIFI router 330 to provide a wireless local area network, identify a PRL for devices registering over the WLAN, receive PRLs from external equipment, and transfer PRLs to user devices, among other operations. The software may also include user software applications. The software may be implemented as a single application or as multiple applications. In general, the software may, when loaded into processing system 312 and executed, transform processing system 312 from a general-purpose device into a special-purpose device customized as described herein.

Preferred roaming list (PRL) server 323 is a PRL server of home cellular communication network 322, which provides home cellular communication services to WCD 310.

PRL server 323 comprises communication interfaces, computer systems, microprocessors, circuitry, computer-readable media, or other processing devices or software systems, and may be distributed among multiple processing devices. PRL 323 could be included in the equipment or systems of home cellular network 322, or could be included in separate equipment or systems. Examples of PRL 323 may also include software such as an operating system, logs, utilities, drivers, databases, data structures, networking software, and other software stored on a computer-readable medium. PRL 323 could also include an application server, application service provider system, database system, web server, or other systems.

Internet 332 includes equipment and systems to route packet communications between endpoints using the Internet protocol (IP). Internet 332 can each include equipment and systems as discussed herein for packet network 140, although variations are possible. Internet 332 could comprise routers, switches, gateways, bridges, as well as various network links. Although Internet 332 is shown in FIG. 3, it should be understood that another network could be included, such as packet networks, local area networks, wide area networks, metropolitan area networks, among other networks and systems.

Figure 4:
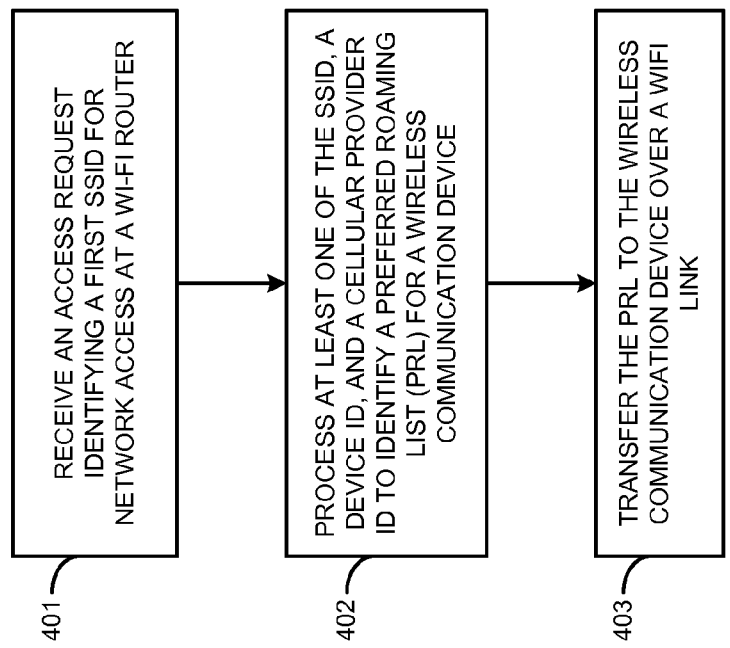
FIG. 4 is a flow diagram illustrating a method of operation of a wireless local area network device.

FIG. 4 is a flow diagram illustrating a method of operation of a wireless local area network device, namely WIFI router 330 of FIG. 3. The operations of FIG. 4 are referenced herein parenthetically. In FIG. 4, WIFI router 330 receives (401) an access request identifying a first service set identifier (SSID) for network access. An SSID is typically employed by a WIFI router, WIFI access point, or similar device to identify a particular wireless local area network via wireless broadcast messaging. Client devices seeking to join or otherwise receive wireless local area network access from the WIFI router or access point typically identify the wireless local area network by the SSID. In this example, WIFI router 330 can broadcast more than one SSID, and WCD 310 can identify one of the SSIDs during an access request for wireless local area network access from WIFI router 330. As a specific example, table 314 illustrates WIFI router 330 broadcasting three SSIDs, namely ALPHA, BETA, and GAMMA.

In some examples, identifying the SSID with the access request merely involves selecting the SSID by WCD 310 for access through WIFI router 330. In other examples, WCD 310 transfers an indicator of the SSID to WIFI router 330. The SSID can correspond to a particular service identifier associated with home cellular network 322, such as an SSID which identifies WCD 310 as a customer of home cellular network 322. For example, if home cellular network 322 is operated by Sprint®, and if WCD 310 is a Sprint® customer, then the SSID selected by WCD 310 when joining the wireless local area network provided by WIFI router 330 can be an SSID associated with Sprint®. Other SSID configurations and network providers are possible.

WIFI router 330 processes (402) at least one of the SSID, a device identifier (ID), and a cellular provider ID to identify a PRL for WCD 310. During initial network registration or at a later time, WCD 310 can provide various information to WIFI router 330. This information can include a device ID which uniquely identifies WCD 310, such as an electronic serial number (ESN), mobile station ID (MSID), mobile identification number (MIN), mobile device number (MDN), and the like. This information can include a cellular provider ID which identifies a cellular network provider associated with WCD 310, such as a home network provider for WCD 310. Other information can also be provided to WIFI router 330, this information can be provided during a registration process, an access request process, or a dedicated information exchange process, including combinations thereof.

To identify the PRL for WCD 310, WIFI router 330 can select among several PRLs stored within a computer readable memory of WIFI router 330, or PRL server 323 can select the PRL or multiple PRLs and transfer the PRLs to WIFI router 330, including combinations thereof. Tables 314 and 315 include example correlations of various example PRLs to SSIDs and network operator identifiers, respectively. Other correlations can be employed, such as correlations between a device identifier for WCD 310, a geographic location of WIFI router 330, among other correlations. Thus, identifying the PRL can include processing at least one of a SSID, a geographic location of WIFI router 330, a device type or ID of WCD 310, and a cellular network operator associated with WCD 310.

The geographic location of WIFI router 330 can be predetermined and stored within a computer readable medium of WIFI router 330. The geographic location can indicate a country, region, city, geographic coordinates, latitude and longitude, or address, among other indicators of geographic location of WIFI router 330. This geographic location of WIFI router 330 can be provided to PRL server 323 and PRL server 323 can select information for inclusion in PRL 360 based on the geographic location of WIFI router 330. Since in many examples, a PRL is location dependent, providing a geographic location to PRL server 323 can aid in PRL server 323 determining a proper PRL for that geographic location. When a geographic location of WIFI router 330 is provided to PRL server 323, then PRL server 323 identifies PRL 360 based on at least the geographic location and responsively transfers PRL 360 for delivery to WIFI router 330.

Table 314 indicates a single PRL for each SSID, with three SSIDs listed. The SSIDs can be broadcast by WIFI router 330 (or inhibited from broadcast for security) and associated with a separate WLAN provided by WIFI router 330. Table 315 indicates a single PRL for each cellular network provider, with three example network providers listed. The PRL for each cellular network provider can be collected by WIFI router 330 or delivered to WIFI router 330 prior to registration of WCD 310 or other wireless communication devices, and stored therein. The PRL for each network provider can be associated with a geographic location of WIFI router 330, and thus a PRL can be stored in WIFI router 330 for each network provider based on geographic location of WIFI router 330. In some examples, combinations of the SSID, network provider, and geographic location are used in identifying the PRL for WCD 310. For example, each SSID of table 314 can be associated with a different network provider, and the selection of a particular SSID by WCD 310 during the WLAN registration process can retrieve a particular PRL. In yet further examples, the SSID is provided by WIFI router 330 to PRL server 323, and PRL server 323 identifies PRL 360 based on at least the provided SSID.

WIFI router 330 transfers (403) the PRL to WCD 310 over a WIFI link, namely WLAN link 331. The PRL can be transferred to WCD 310 during a registration process, an access request process, or a dedicated PRL delivery process, including combinations thereof. The PRL can be transferred in packets over wireless local area network link 331, such as Ethernet packets, IP packets, Wi-Fi packets, personal area network packets, or other data network structures or datagrams, including combinations thereof. WCD 310 receives the PRL and responsively updates a PRL configuration of WCD 310 according to the PRL.

As discussed previously, a preferred roaming list can be employed by a user device for accessing communication services over a cellular communication network, such as home cellular network 322 or roaming cellular network 342. PRL 360 includes information related to initial access of a cellular communication network or cellular service, such as carrier frequencies, network identifiers, offsets, or other information, including combinations thereof. This information can also include information related to initial network access using cellular communication frequencies and channels. For example, a PRL can include a listing of carrier frequencies or carrier channels corresponding to a cellular network operator, along with other corresponding information related to channels, frequency offsets, bandwidth indicators, modulation information, pseudo-random noise (PN) status, and the like. A PRL can also indicate a priority of cellular network operators to be used in roaming operations.

Advantageously, WCD 310 can receive a PRL or PRL update via WIFI router 330 and over WLAN link 331. This configuration can provide a pathway alternate to home cellular network 322 to transfer PRL information to WCD 310. In areas of poor cellular coverage, such as in buildings, offices, stadiums, homes, and the like, a cellular network may have difficulty in transferring a PRL to a user device. Thus, without an updated PRL, the user device such as WCD 310, may have difficulty in finding, detecting, or prioritizing home and roaming cellular networks. Described herein are methods, systems, and software to transfer a PRL or PRL update to a user device over a wireless local area network via a WLAN device, such as WIFI router 330.

Referring back to FIG. 1, wireless communication device (WCD) 110 comprises transceiver circuitry and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. In this example, wireless communication device 110 includes multiple transceiver portions or antenna portions, among other circuit and equipment elements, for communicating wirelessly with multiple wireless communication networks, using different wireless communication modes or wireless communication protocols.

Wireless local area network (WLAN) device 120 comprises RF communication and control circuitry, antenna elements, and communication routing equipment and systems for providing a wireless local area network, such as WLAN 150. The RF communication circuitry typically includes amplifiers, filters, RF modulators, transceivers, and signal processing circuitry. In many examples, WLAN device 120 includes circuitry and equipment to provide a wireless local area network to user devices for routing user communications between packet network 140 and user devices, among other operations. WLAN device 120 may also comprise a wireless hotspot, wireless access point, wireless router, IEEE 802.11 wireless router, IEEE 802.11 wireless access point, IEEE 802.15 hub, data buffers, data modems, packet routers, servers, memory devices, software, processing systems, cabling, network communication interfaces, physical structural supports, user interfaces, or other communication apparatuses. WLAN device 120 may also include processing systems, computer-readable media, application programs, firmware, or some other form of computer-readable processing instructions. The computer-readable media may include a disk, tape, integrated circuit, server, or some other memory device, and also may be distributed among multiple memory devices.

Cellular network 130 comprises communication and control systems for providing access to communication services for user devices. Cellular network 130 can provide communication services including voice calls, text messages, data access, or other communication services provided over a cellular communication network. In some examples, cellular network 130 includes equipment to provide wireless access to communication services within different coverage areas to user devices, route communications between content providers and user devices, and facilitate handoffs between equipment of different coverage areas, among other operations. Cellular network 130 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, preferred routing list (PRL) systems, or other communication and control equipment.

Packet network 140 includes equipment and systems to route packet communications between endpoints using packet-based communication protocols, including Internet protocol (IP) and Ethernet. Packet network 140 could comprise routers, switches, gateways, bridges, as well as various network links. Although packet network 140 is shown in FIG. 1, it should be understood that other networks could be included, such as the Internet, local area networks, wide area networks, metropolitan area networks, among other networks and systems.

Wireless local area network (WLAN) 150 uses the air or space as the transport media. WLAN 150 comprises a wireless local area network communication link, and may use various protocols, such as IEEE 802.11, IEEE 802.15, wireless fidelity (Wi-Fi), Bluetooth, Zigbee, or some other wireless LAN or wireless personal area network (PAN), including combinations, improvements, or variations thereof.

Communication link 151 uses metal, glass, optical, air, space, or some other material as the transport media. Communication link 151 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 151 can be a direct link or may include intermediate networks, systems, or devices, and can include a logical network link transported over multiple physical links.

Wireless link 152 uses the air or space as the transport media. Wireless link 152 comprises a cellular communication link, and may use various protocols, such as Code Division Multiple Access (CDMA), Evolution-Data Optimized (EVDO), single-carrier radio transmission technology link (1×RTT), Worldwide Interoperability for Microwave Access (WiMAX), Global System for Mobile Communication (GSM), Universal Mobile Telecommunications System (UMTS), Long Term Evolution (LTE), High Speed Packet Access (HSPA), Radio Link Protocol (RLP), or some other cellular or wireless communication format, including combinations, improvements, or variations thereof.

Although one main wireless link for each of links 150 and 152 is shown in FIG. 1, it should be understood that wireless links 150 and 152 are merely illustrative to show communication modes or wireless access pathways for wireless communication device 110. In other examples, further wireless links can be shown, with portions of the further wireless links shared and used for different communication sessions or different content types, among other configurations.

Communication links 150-152 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless local area network (WLAN) device, the method comprising:
   providing a WLAN for wireless communication devices to access communication services of a cellular communication network over the WLAN;
   receiving at least a preferred roaming list (PRL) provided by the cellular communication network that indicates access parameters for at least one roaming cellular communication network other than the cellular communication network;
   receiving a request for network access to the WLAN from a first wireless communication device having the cellular communication network as a home network provider;
   selecting the PRL for the first wireless communication device responsive to at least the request and information associated with the first wireless communication device, wherein selecting the PRL comprises processing the information associated with the first wireless communication device comprising a geographic location of the WLAN device, a device type of the first wireless communication device, and a cellular network operator associated with the first wireless communication device to select the PRL from among a plurality of preferred roaming lists; and
   transferring the PRL provided by the cellular communication network to the first wireless communication device over the WLAN, wherein the first wireless communication device can employ the access parameters indicated in the PRL to access the at least one roaming cellular communication network.

2. The method of claim 1, wherein transferring the PRL to the first wireless communication device comprises transferring the PRL to the first wireless communication device over the WLAN during registration of the first wireless communication device with the WLAN.

3. The method of claim 1, further comprising:
   receiving a first indicator of the device type and a second indicator of the cellular network operator from the first wireless communication device over the WLAN.

4. The method of claim 1, further comprising:
   determining the geographic location of the WLAN device and providing at least the geographic location of the WLAN device to a PRL server of the cellular communication network; and
   receiving at least the PRL in response to providing at least the geographic location, wherein the PRL server of the cellular communication network selects the PRL based at least on the geographic location of the WLAN device.

5. The method of claim 1, wherein the first wireless communication device receives the PRL and responsively updates a PRL configuration in the first wireless communication device according to the PRL.

6. The method of claim 1, wherein receiving the request for the network access to the WLAN from the first wireless communication device comprises receiving a selection of a service set identifier (SSID) associated with the WLAN device from among a plurality of service set identifiers presented by the WLAN device; and
   wherein selecting the PRL for the first wireless communication device comprises selecting the PRL based on at least the selection of the SSID being associated with the cellular communication network.

7. The method of claim 6, wherein the first wireless communication device selects the SSID for the network access based on at least identifying the cellular communication network as the home network provider of the first wireless communication device.

8. The method of claim 1, wherein receiving the request for the network access to the WLAN from the first wireless communication device comprises receiving an indicator of a service set identifier (SSID) from the first wireless communication device; and
   wherein selecting the PRL for the first wireless communication device comprises providing the SSID to a PRL server of the cellular communication network and responsively receiving the PRL that is selected by the PRL server from among a plurality of preferred roaming lists based on at least the SSID.

9. The method of claim 1, wherein the WLAN device comprises a WLAN router configured to provide Internet access over the cellular communication network to the first wireless communication device over the WLAN.

10. A wireless local area network (WLAN) device, comprising:
    a communication interface configured to provide a WLAN for wireless communication devices to access communication services of a cellular communication network over the WLAN;
    the communication interface configured to receive at least a preferred roaming list (PRL) provided by the cellular communication network that indicates access parameters for at least one roaming cellular communication network other than the cellular communication network;

the communication interface configured to receive a request for network access to the WLAN from a first wireless communication device having the cellular communication network as a home network provider;

a processing system configured to select the PRL for first wireless communication device responsive to at least the request and information associated with the first wireless communication device, wherein the processing system is configured to process the information associated with the first wireless communication device comprising a geographic location of the WLAN device, a device type of the first wireless communication device, and a cellular network operator associated with the first wireless communication device to select the PRL from among a plurality of preferred roaming lists; and the communication interface configured to transfer the PRL provided by the cellular communication network to the first wireless communication device over the WLAN, wherein the first wireless communication device can employ the access parameters in the PRL to access the at least one roaming cellular communication network.

11. The WLAN device of claim 10, comprising:
the communication interface configured to transfer the PRL to the first wireless communication device over the WLAN during registration of the first wireless communication device with the WLAN.

12. The WLAN device of claim 10, comprising:
the communication interface configured to receive a first indicator of the device type and a second indicator of the cellular network operator from the first wireless communication device over the WLAN.

13. The WLAN device of claim 10, comprising:
the processing system configured to determine the geographic location of the WLAN device and provide at least the geographic location of the WLAN device for delivery to a PRL server of the cellular communication network; and the processing system configured to receive the PRL transferred by the PRL server in response to providing at least the geographic location, wherein the PRL server of the cellular communication network selects the PRL based at least on the geographic location of the WLAN device.

14. The WLAN device of claim 10, wherein the first wireless communication device receives the PRL and responsively updates a PRL configuration in the first wireless communication device according to the PRL.

15. The WLAN device of claim 10, comprising:
the communication interface configured to receive from the first wireless communication device a selection of a service set identifier (SSID) associated with the WLAN device from among a plurality of service set identifiers presented by the WLAN device; and wherein the processing system is configured to select the PRL based at least on the selection of the SSID being associated with the cellular communication network.

16. The WLAN device of claim 15, wherein the first wireless communication device selects the SSID for the network access based on at least identifying the cellular communication network as the home network provider of the first wireless communication device.

17. The WLAN device of claim 10, comprising:
the communication interface configured to receive a service set identifier (SSID) from the first wireless communication device; and the processing system configured to provide the SSID to a PRL server of cellular communication network and responsively receive the PRL that is selected by the PRL server from among a plurality of preferred roaming lists based on at least the SSID.

18. The WLAN device of claim 10, comprising:
a WLAN router configured to provide Internet access over the cellular communication network to the first wireless communication device over the WLAN.

* * * * *